Nov. 2, 1937.  J. HANUS  2,098,144
AIR CONTROLLING DEVICE FOR BLOWERS
Filed July 20, 1936
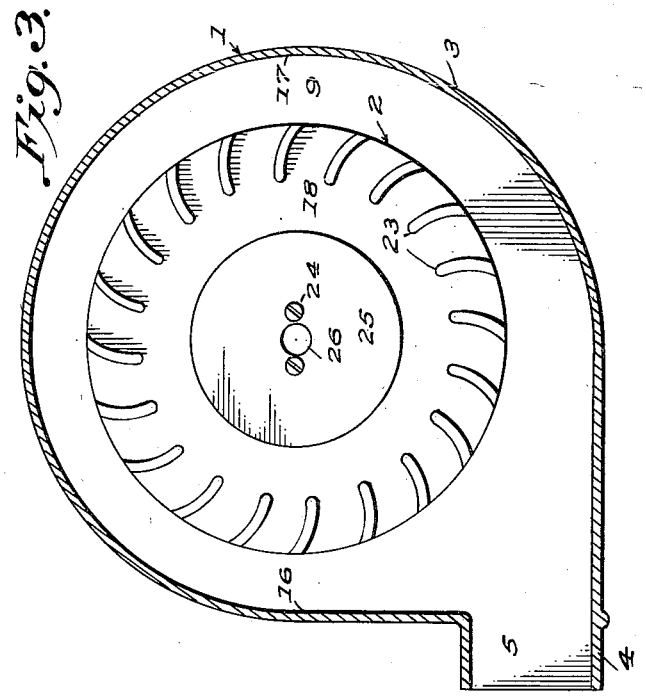
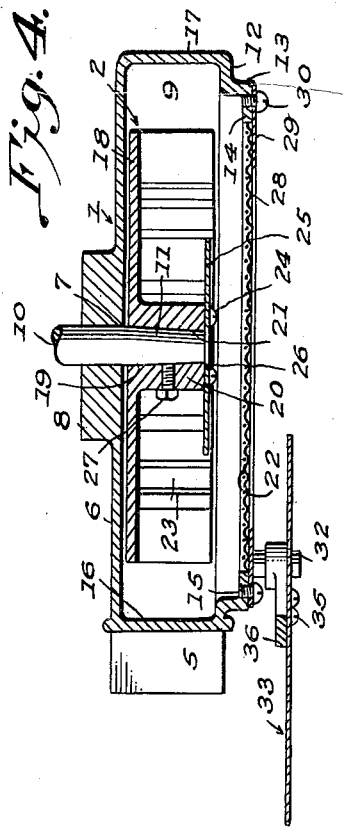
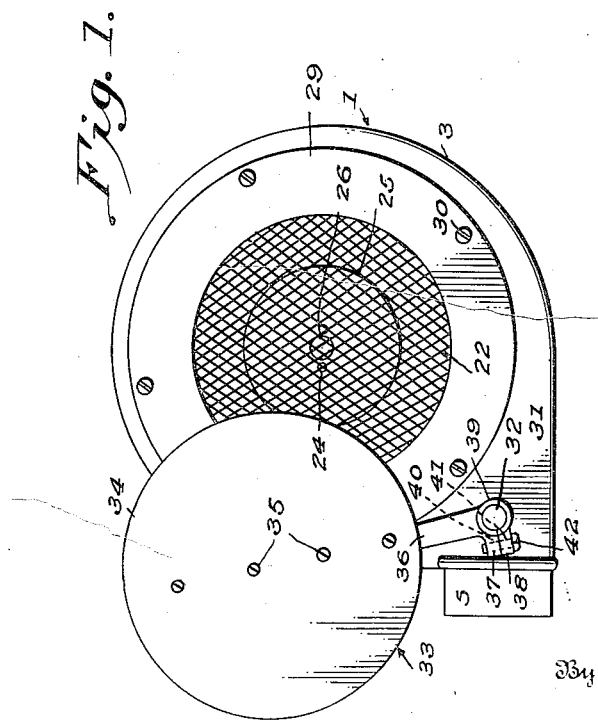
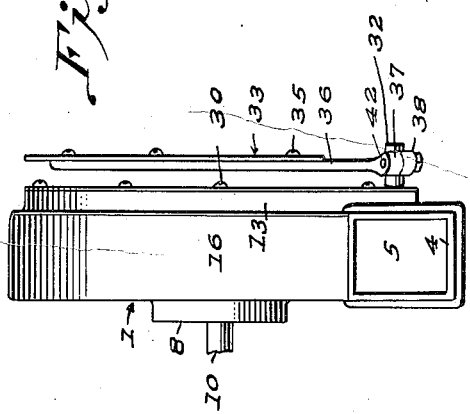
Inventor
JOHN HANUS
By Kimmel & Crowell
Attorneys Patented Nov. 2, 1937

2,098,144

UNITED STATES PATENT OFFICE 2,098,144

AIR CONTROLLING DEVICE FOR BLOWERS

John Hanus, Appleton, Wis.

Application July 20, 1936, Serial No. 91,582

2 Claims. (Cl. 230—114)

This invention relates to an air controlling attachment for blowers used in connection with stokers, and has for its object to provide, in a manner hereinafter set forth an attachment of the class referred to, capable when used to produce an approximate savings in fuel of about fifty percent and increase the efficiency of the blower approximately one hundred percent, and further providing for the utilization of a great percent of the heat which ordinarily escapes through the chimney.

Further objects of the invention are to provide in a manner as hereinafter set forth, an attachment of the class referred to which is comparatively simple in its construction and arrangement, strong, durable, readily installed with respect to the fan housing of the blower, conveniently adjusted, thoroughly efficient in its use, capable of fitting any size and make of blower by increasing or decreasing the size thereof, and comparatively inexpensive to manufacture.

With the foregoing and other objects in view, the invention consists of a novel construction, combination and arrangement of parts as will be more specifically referred to and as illustrated in the accompanying drawing wherein is shown an embodiment of the invention, but it is to be understood that changes, variations and modifications may be resorted to which fall within the scope of the invention as claimed.

In the drawing:

Figure 1 is a front elevation of the fan housing of a blower showing the adaptation therewith of the attachment in accordance with this invention and with the attachment adjusted to an extent to open the major portion of the air intake of the fan housing.

Figure 2 is an elevation looking towards one edge of the fan housing with the attachment connecting to the latter.

Figure 3 is a vertical sectional view of the fan housing, and

Figure 4 is a sectional plan of the fan housing with the attachment coupled thereto.

Referring to the drawing 1 generally indicates a housing for a rotatable fan generally indicated at 2. The housing 1 includes a substantially circular body 3 formed at its bottom with a tangentially disposed hollow extension 4 which provides an air outlet 5. Integral with the rear of the body 3 is the rear wall 6 of housing 1 formed with an axial opening 7 and a peripheral boss 8 which has its inner edge register with the edge of opening 7. Extending through the opening 7 and boss 8 into the fan chamber 9 provided by housing 1 is a drive shaft 10 for the fan 2. The inner portion 11 of shaft 10 is tapered. The front of the body portion 3 is formed with an inwardly extending annular flange 12 which terminates into an outwardly directed ring 13 merging at its outer end into an inwardly extending annular flange 14. The latter is formed with a row of spaced threaded openings 15. The side 16 of body portion 3 is of greater width than the side 17 of the said body portion. The side portion 14 projects laterally in opposite directions with respect to the rear wall 6 and flange 12. The extension 4 preferably is formed by integral portions of the body 3, flange 12 and rear wall 6. The housing preferably will be an integral casting.

The fan 2 includes a disc 18 formed with an axial opening 19 and a hub 20 having a tapered bore 21. The hub 20 extends towards the air intake 22 provided by the flange 14. The diameter of the opening provided by the flange 14 will be reduced by a means to be referred to.

Formed integral with the disc 18 and encompassing the hub 20 is a series of spaced curved vanes 23 having their edges flush with the outer edge of disc 18. Secured to the free end of the hub 20, by the holdfast means 24 is an apertured disc 25 of materially less diameter than the disc 18. The shaft 10 has its tapered portion extend through the bore 21 into the opening 26 in disc 25. The diameter of the disc 18 is less than the opening formed by flange 12. The shaft 10 is anchored to the hub 20 by a binding screw 27.

Positioned against the flange 14 is a reticulated member 28. Arranged against the outer face of the member 28 is a flat annulus 29 having its inner diameter materially less than the diameter of the disc 18. The member 28 and annulus 29 are anchored to the flange 14 by a holdfast means 30 which extends through the annulus 29, member 28, and engage with the threaded openings 15 formed in the flange 14.

The lower portion of one side of the flange 12 is of greater width than remaining portions of such flange and the said part of greater width is indicated at 31. Anchored to the part 31 is a stud 32 to which is pivotally connected a controlling element 33 employed for varying the size of the reticulated air intake of the housing 1. The element 33 consists of a circular disc 34 of greater diameter than the disc 18, and also of greater diameter than the inner diameter of the annulus 29. Secured to the inner face of the disc 34, by the holdfast means 35 and extending from the edge of disc 34 is a carrier 36 for the latter and which is adjustably mounted on the stud 32. The carrier 36 is in the form of a bar of a desired length and has its lower end formed with a pair of laterally extending superposed extensions 37, 38. The lower end of the carrier 36 is formed with a split loop 39 which is mounted on stud 32. The extensions 37, 38 project from the split end of the loop 39. The extensions 37, 38 have openings 40, 41 and threadably engaged with the wall of opening 40 is a clamping bolt 42 acting when screwed home to clamp the element 33 in its adjusted position relative to the reticulated portion of the air intake. The element 33 functions to vary the supply of air through the air intake to the fan.

The attachment is employed to control and regulate the air entering into the blower and it is arranged in relation to the air intake leading to the fan. The attachment, when used, produces an approximate saving in fuel of about 50 percent, and increases the efficiency of the blower approximately one hundred percent and further acts to cause the utilization of a greater percentage of the heat which ordinarily escapes through the chimney.

What I claim is:

1. In an attachment for controlling the intake of air to a blower of that type having one of its sides formed with means spaced inwardly from the top, bottom, front and rear thereof to provide a screened air intake, the combination of a stud for connection to the lower portion of said side, said stud being spaced outwardly adjacent to and extending beyond said means, a disc for extension across said intake for varying the area of the latter, said disc being movable in an arcuate path and of greater area than said intake, an upstanding carrier having its upper portion fixed to said disc for suspending the latter permanently in a position to extend across said intake, said upper fixed portion of the carrier disposed diametrically of that face of the disc which opposes the intake, said carrier being adjustably mounted at its lower end on said stud, and means for releasably securing said carrier stationary in its adjusted position.

2. In an attachment for controlling the intake of air to a blower of that type having one of its sides formed with means spaced inwardly from the top, bottom, front and rear thereof to provide a screened air intake, the combination of a stud for connection to the lower portion of said side, said stud being spaced outwardly adjacent to and extending beyond said means, a disc for extension across said intake for varying the area of the latter, said disc being movable in an arcuate path and of greater area than said intake, an upstanding carrier having its upper portion fixed to said disc for suspending the latter permanently in a position to extend across said intake, said carrier having means to provide a split loop at its lower end for adjustably mounting it on said stud, said carrier being formed with superposed extensions disposed in lateral relation with respect to the split ends of the loop, and means carried by said extensions for releasably securing said carrier stationary in its adjusted position.

JOHN HANUS.